United States Patent [19]
Mangles

[11] Patent Number: 5,997,305
[45] Date of Patent: Dec. 7, 1999

[54] FLEXIBLE PLANAR APPARATUS

[76] Inventor: Linda Mangles, 63 Rosemary Road, Wickersley, Rotherham, United Kingdom, S66 ODE

[21] Appl. No.: 09/141,353

[22] Filed: Aug. 27, 1998

[51] Int. Cl.$^6$ .................................................. G09B 19/02
[52] U.S. Cl. .......................... 434/209; 434/188; 434/191
[58] Field of Search .................................. 434/161, 176, 434/188, 197, 209, 430, 187; 273/293, 299, 302; 40/124.09, 124.14, 124.19

[56] References Cited

U.S. PATENT DOCUMENTS

| | | | |
|---|---|---|---|
| 1,163,125 | 12/1915 | Bechmann | 434/209 |
| 2,871,581 | 2/1959 | Guzak | 273/236 |
| 3,009,262 | 11/1961 | Moran | 434/201 |
| 3,487,578 | 1/1970 | Sudermann . | |
| 3,628,261 | 12/1971 | Thompson . | |
| 3,999,310 | 12/1976 | Lufkin et al. . | |
| 4,445,865 | 5/1984 | Sellon | 434/207 |
| 4,466,799 | 8/1984 | Argio | 434/203 |
| 4,642,086 | 2/1987 | Howarth | 493/341 |
| 5,098,301 | 3/1992 | Woods | 434/195 |
| 5,207,457 | 5/1993 | Haynes . | |
| 5,651,628 | 7/1997 | Bankes | 402/73 |

FOREIGN PATENT DOCUMENTS

| | | | |
|---|---|---|---|
| 140134 | 4/1903 | Germany | 434/188 |
| 713731 | 8/1954 | United Kingdom | 434/188 |
| WO 96/17333 | 6/1996 | WIPO . | |

*Primary Examiner*—D. Neal Muir
*Assistant Examiner*—Kurt Fernstrom
*Attorney, Agent, or Firm*—James C. Wray; Meera P. Narasimhan

[57] ABSTRACT

A flexible planar apparatus fabricated from polyvinylchloride has a matrix of foldable lines defining a plurality of quadrilateral tiles. Said tiles are configured to convey information, such as a multiplication table using numerals or Braille characters. The foldable lines allow a first fold of the apparatus to be manually effected followed by a second substantially orthogonal fold of said apparatus, thereby uniquely identifying one of the tiles, which may represent the product of multiplicands in a times table.

13 Claims, 6 Drawing Sheets

| 1 | 2 | 3 | 4 | 5 | 6 | 7 | 8 | 9 | 10 | 11 | 12 |
|---|---|---|---|---|---|---|---|---|---|---|---|
| 2 | 4 | 6 | 8 | 10 | 12 | 14 | 16 | 18 | 20 | 22 | 24 |
| 3 | 6 | 9 | 12 | 15 | 18 | 21 | 24 | 27 | 30 | 33 | 36 |
| 4 | 8 | 12 | 16 | 20 | 24 | 28 | 32 | 36 | 40 | 44 | 48 |
| 5 | 10 | 15 | 20 | 25 | 30 | 35 | 40 | 45 | 50 | 55 | 60 |
| 6 | 12 | 18 | 24 | 30 | 36 | 42 | 48 | 54 | 60 | 66 | 72 |
| 7 | 14 | 21 | 28 | 35 | 42 | 49 | 56 | 63 | 70 | 77 | 84 |
| 8 | 16 | 24 | 32 | 40 | 48 | 56 | 64 | 72 | 80 | 88 | 96 |
| 9 | 18 | 27 | 36 | 45 | 54 | 63 | 72 | 81 | 90 | 99 | 108 |
| 10 | 20 | 30 | 40 | 50 | 60 | 70 | 80 | 90 | 100 | 110 | 120 |
| 11 | 22 | 33 | 44 | 55 | 66 | 77 | 88 | 99 | 110 | 121 | 132 |
| 12 | 24 | 36 | 48 | 60 | 72 | 84 | 96 | 108 | 120 | 132 | 144 |

(Labels: 301, 302, 306, 309)

|   |   |   |   |   |   |   |   |   |   |   |   |
|---|---|---|---|---|---|---|---|---|---|---|---|
| 1 | 2 | 3 | 4 | 5 | 6 | 7 | 8 | 9 | 10 | 11 | 12 |
| 2 | 4 | 6 | 8 | 10 | 12 | 14 | 16 | 18 | 20 | 22 | 24 |
| 3 | 6 | 9 | 12 | 15 | 18 | 21 | 24 | 27 | 30 | 33 | 36 |
| 4 | 8 | 12 | 16 | 20 | 24 | 28 | 32 | 36 | 40 | 44 | 48 |
| 5 | 10 | 15 | 20 | 25 | 30 | 35 | 40 | 45 | 50 | 55 | 60 |
| 6 | 12 | 18 | 24 | 30 | 36 | 42 | 48 | 54 | 60 | 66 | 72 |
| 7 | 14 | 21 | 28 | 35 | 42 | 49 | 56 | 63 | 70 | 77 | 84 |
| 8 | 16 | 24 | 32 | 40 | 48 | 56 | 64 | 72 | 80 | 88 | 96 |
| 9 | 18 | 27 | 36 | 45 | 54 | 63 | 72 | 81 | 90 | 99 | 108 |
| 10 | 20 | 30 | 40 | 50 | 60 | 70 | 80 | 90 | 100 | 110 | 120 |
| 11 | 22 | 33 | 44 | 55 | 66 | 77 | 88 | 99 | 110 | 121 | 132 |
| 12 | 24 | 36 | 48 | 60 | 72 | 84 | 96 | 108 | 120 | 132 | 144 |

Figure 3

FLEXIBLE PLANAR APPARATUS

FIELD OF THE INVENTION

The present invention relates to a flexible planar apparatus which may have tiles identified thereon.

BACKGROUND OF THE INVENTION

The representation of information in tabular form has been known for many years. An early introduction to this form of representation consists of a times table in which a matrix is defined in a 12×12 array, with first multiplicands 1 to 12 defined across the first row and second multiplicands 1 to 12 defined along a first column. The intersections of rows and columns then define the product of the two related multiplicands, thereby facilitating quick identification of the appropriate answer.

Tables of this form are also known in other applications, such as logarithmic tables, travel time tables and many other forms of charts, such as colour charts etc, where a resulting output property may be derived from the combination of two variable input properties. Thus, a particular shade of pink may be identified as being derived from a combination of saturated red with a proportion of added white. Thus, combined colour of this form may be specified in terms of its input proportions and a table may be used to facilitate the identification.

Tables are often used in computer systems such as data bases and spread sheets etc, therefore gaining a grasp of table use, along with a grasp of basic multiplication, is an important educational step and difficulties encountered at this stage may result in an inability to grasp more complex situations in later years.

SUMMARY OF THE INVENTION

According to a first aspect of the present invention, there is provided a flexible planar apparatus having a matrix of foldable lines defining a plurality of quadrilateral tiles, wherein said tiles are configured to convey information; and said foldable lines allow a first fold of said apparatus to be manually effected followed by a second orthogonal fold of said apparatus, thereby uniquely identifying one of said tiles.

In a preferred embodiment, the planar apparatus fabricated from a plastics material, such as flexible polyvinylchloride. Preferably, the foldable lines are made by the application of heat and pressure to the plastics material.

According to a second aspect of the present invention, there is provided a method of performing a multiplication using a flexible planar apparatus having a matrix of foldable lines defining a plurality of quadrilateral tiles, wherein said tiles are configured to convey individual members of a times table, comprising steps of folding said apparatus along the first fold line at a position of a first multiplicand; and folding said device along a substantially orthogonal second fold line against said second multiplicand, wherein the product of said multiplicands is identified at the intersection of said fold lines.

In a preferred embodiment, the planar apparatus is fabricated from a plastics material such as flexible polyvinylchloride. Preferably, the foldable lines are made by the application of heat and pressure to said plastics material.

BRIEF DESCRIPTION OF THE DRAWINGS

FIG. 3 shows a plan view of the whole of the apparatus detailed in FIG. 2;

DETAILED DESCRIPTION OF THE PREFERRED EMBODIMENTS

A flexible planar apparatus is manufactured from flexible pvc having a sheet thickness of 0.35 mm. A matrix of foldable lines define a plurality of quadrilateral tiles within the pvc sheet such that each tile is arranged to convey information. The foldable lines allow a first fold of the apparatus to be manually effected followed by a second or substantially orthogonal fold of the apparatus. In this way, it is possible to uniquely identify one of the tiles as existing at a particular intersection of a selected row and a selected column. Flexible pvc sheet is calendared to produce a grain embossed finish by passing the material through rollers having a grain texture. The sheet is opaque and has a thickness of between 0.25 and 0.45 mm, with 0.35 being a preferred sheet thickness.

The sheet is cut to a size suitable for 4 units to be produced on a single pass and information is screen printed onto the pvc sheet in this 4-up fashion.

Figure 1:
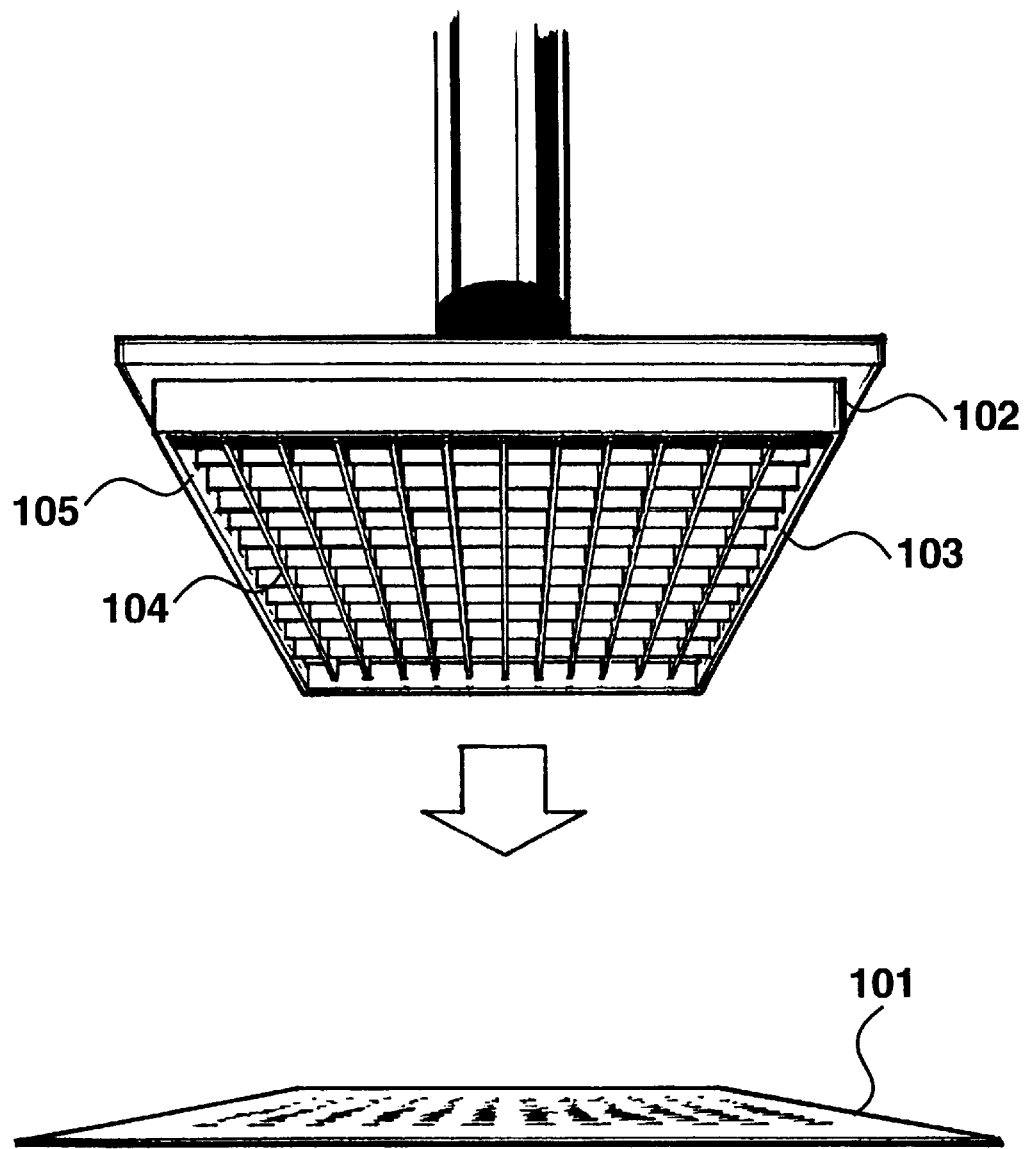
FIG. 1 shows a welding station configured to manufacture a flexible planar apparatus.

Printed sheet of this type, identified as 101 in FIG. 1, is supported in a flat fashion whereafter a high frequency welding head 102 is brought into contact with the sheet. The welding head consists of a brass rule 103 defining a grid. Within the main grid positions 104 the rules have a flat edge and are set slightly raised, to approximately half the sheet thickness, compared to edge sections 105. The edge sections 105 are sharp such that as the head is applied to the sheet portions of the sheet are actually cut or nearly cut. After the welding head is removed, an operator removes the sheet and tears the heavily scored sections so as to remove four finished products from the remainder of the sheet.

The grid weld lines, produced by the internal grid 104, are stopped two-thirds of millimeter short of the edge so as to prevent a tendency of the sheet tear along the welds during repeated use.

Figure 2:
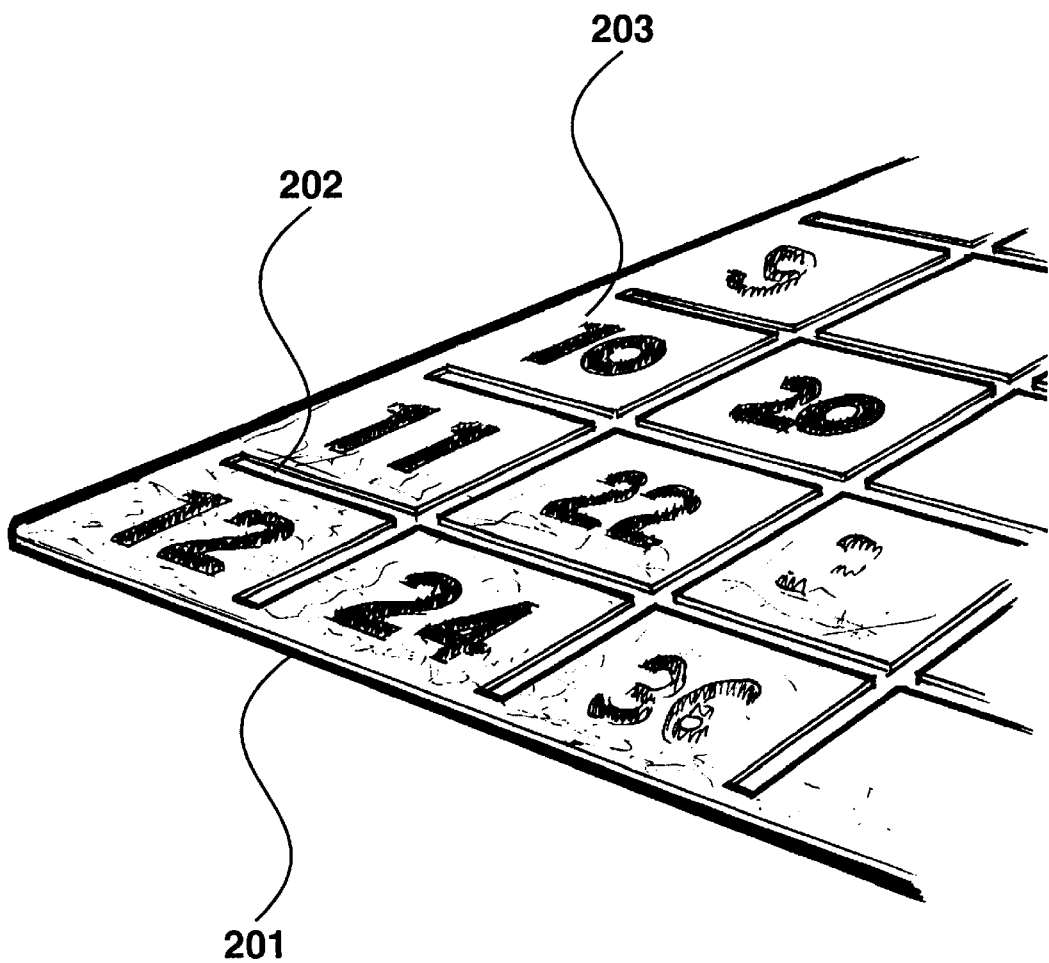
FIG. 2 shows a detail of a planar apparatus produced by the arrangement shown in FIG. 1.

A detailed section of the resulting product is shown in FIG. 2. The product has an edge 201 which has been cut out from the sheet material as defined by the action of the welding head 102. Internal welds 202 have been produced cutting substantially halfway into the thickness of the pvc sheet. In this way, it is possible to fold the sheet along the welded lines so as to identify a particular column of tiles 203 or a particular row of said tiles. Each tile has information printed thereon. In the example shown in FIG. 2, the apparatus is being used to assist with times tables, therefore numerals are printed on the squares. Other mathematical relationships may be printed or other information may be printed, such as colour or any other relationship where an output is derived from two input values.

The finished product is shown schematically in FIG. 3. In this example, a twelve by twelve matrix is shown in which the first row 301 and the first column 302 may be considered as multiplicands from which a product is to be deduced.

Times tables of this type are known and the arrangement may be used, for example, for finding the product of 6×9.

Descending column 302 the value 6 is identified, represented in FIG. 3 by numeral 306. Similarly, traversing across the first row numeral 9 may be identified, represented by reference 309. One may then extend across 306 and down from 309 to identify the intersection of these two values, which in turn represents the product (54) of six and nine.

Children and particularly children with learning difficulties, often experience problems when attempting to locate the required intersection from printed matter. Thus, the actual presentation shown in FIG. 3 may be considered as representative of known systems where children experience difficulties.

The present embodiment is configured such that the matrix illustrated in FIG. 3 becomes a tactile object which may be folded so as to assist in multiplication calculations or any similar calculations where one must identify an intersection between a particular row and a particular column.

Figure 4:
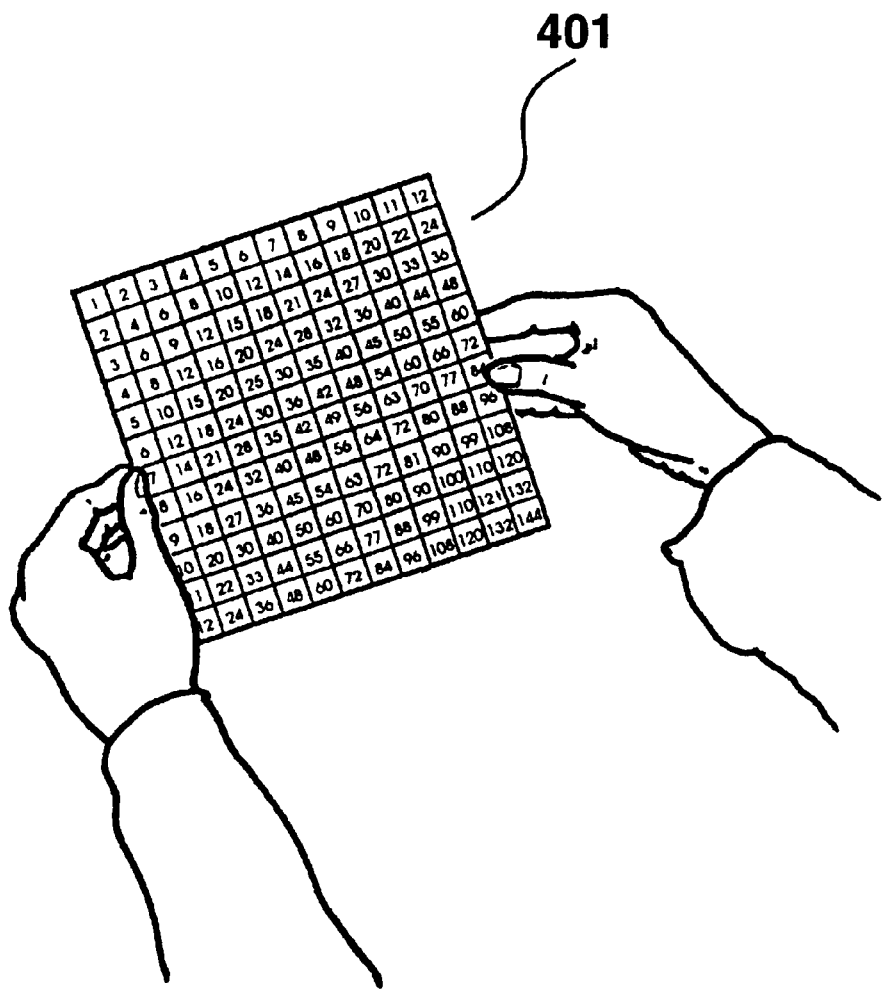
FIG. 4 illustrates the use of the apparatus shown in FIG. 3.

As shown in FIG. 4, the apparatus 401 is held between a users hands so as to facilitate folding along welded score lines 202. Referring to the earlier example, the user identifies the first multiplicand 6 and in particular locates the score line underlying numeral 6.

Figure 5:
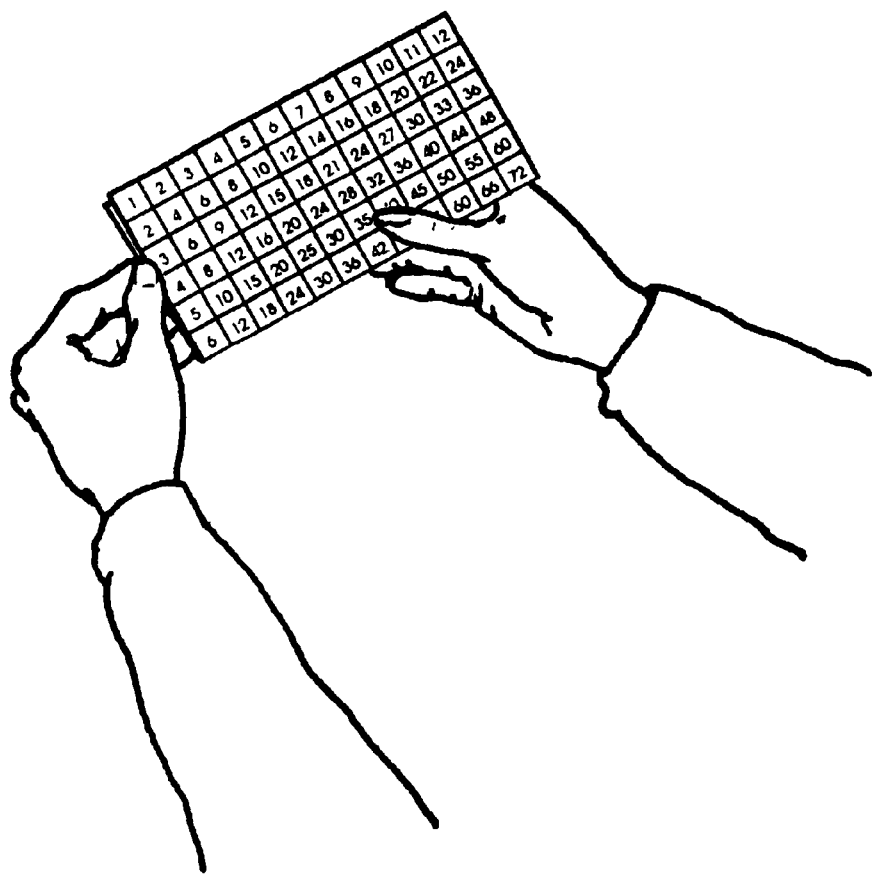
FIG. 5 shows further use of the apparatus shown in FIG. 3.
Figure 6:
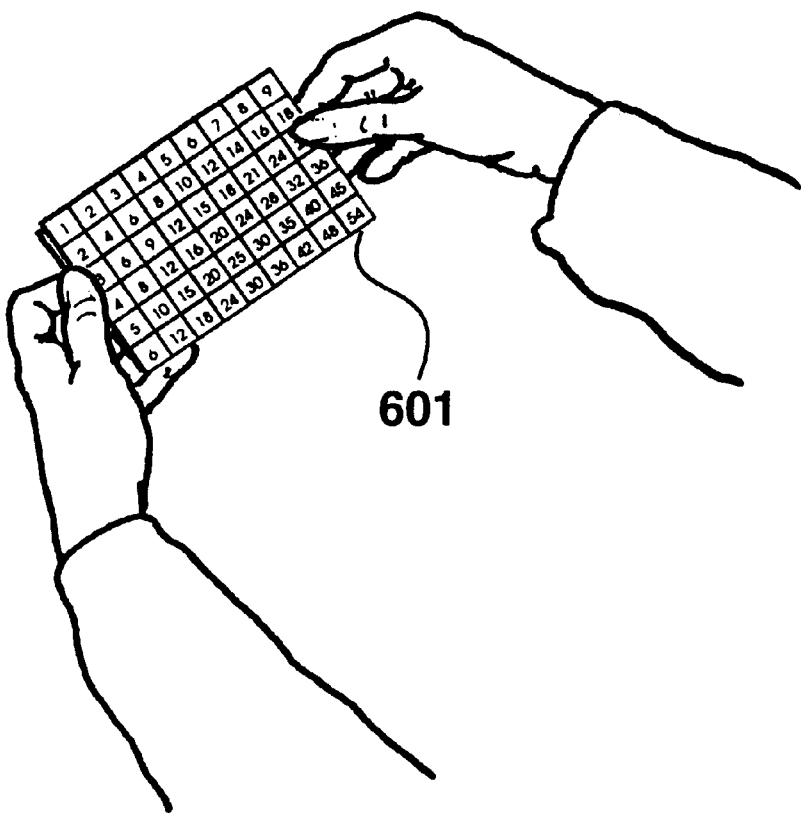
FIG. 6 shows further use of the apparatus shown in FIG. 3.

As shown in FIG. 5, the device is now folded such that the row of interest, the row containing value 6, becomes the bottom row and is thereby clearly distinguishable.

The user now identifies the second multiplicand, 9 in the described example, and again locates the welded fold line to the right of the selected numeral. The welds are such that the apparatus may be folded twice with a selected value 9 being left as the extreme right hand position. Having performed these two operations, the answer at 601, 54 in this example, is clearly distinguished and thereby greatly reduces the risk of someone making a mistake. Furthermore, the use of the device in this way greatly improves user confidence and can greatly assist children with learning difficulties.

The tactile nature of the device assists the learning process, particularly in situations where learning difficulties are experienced. The tactile nature of the device may be further exploited to assist the blind and partially sited. For example, as an alternative to printed numerals, tactile indications, such as Braille characters, may be formed on the device during the pressing procedure, as described with reference to FIG. 1.

Similarly, in professional applications, such as colour selection, the selected colour at position 601 is placed at the edge of the apparatus, thereby allowing it more easily to be compared if, for example, colour matching is to be achieved. Furthermore, it is possible for the device to be held temporarily in a selected orientation such that reference may be made to the selected position easily, again still in confidence in the hands of the user.

What I claim is:

1. A flexible planar apparatus fabricated from a plastics material having a matrix of foldable lines defining a plurality of quadrilateral tiles, wherein said tiles are configured to convey information consisting of the numbers forming a multiplication table, wherein said foldable lines allow a first fold of said apparatus to be manually effected so as to select a portion of said tiles; and said foldable lines allow a second substantially orthogonal fold to be effected so as to uniquely identify one of said tiles, wherein the information displayed on said identified tile represents the product of values identified by said first and second folds.

2. Apparatus according to claim 1, wherein said plastics material is flexible polyvinylchloride.

3. Apparatus according to claim 1, wherein said foldable lines are made by the application of heat and pressure to said plastics material.

4. Apparatus according to claim 1, wherein said tiles are substantially square.

5. Apparatus according to claim 1, wherein said information is represented by tactile indications for a blind or partially sighted person.

6. Apparatus according to claim 5, wherein said indications represent Braille characters.

7. A method of performing a multiplication using a flexible planar apparatus fabricated from a plastics material having a matrix of foldable lines defining a plurality of quadrilateral tiles, wherein said tiles are configured to convey information consisting of the numbers forming a multiplication table, said method comprising steps of folding said apparatus along a first fold line at a position of a first multiplicand; and folding said apparatus along a substantially orthogonal second fold line against said second multiplicand, wherein the product of said multiplicands is identified at the intersection of said fold lines.

8. A method according to claim 7, wherein said plastics material is flexible polyvinylchloride.

9. A method according to claim 7, wherein said foldable lines are made by the application of heat and pressure to said plastics material.

10. A method of manufacturing a flexible planar apparatus comprising the steps of:

printing characters making up a multiplication times table onto a plastic sheet; and applying deforming means to said plastic sheet so as to form a matrix of foldable lines between said characters such that a plurality of quadrilateral tiles is defined by said matrix of foldable lines, and said foldable lines allow a first fold of the apparatus to be manually effected so as to select a portion of the tiles and said foldable lines allow a second substantially orthogonal fold of the apparatus to be manually effected so as to uniquely identify one of said tiles, wherein the information displayed on said identified tile represents the product of values identified by said first and second folds.

11. A method according to claim 10, wherein said foldable lines define substantially square tiles.

12. A method according to claim 10, wherein said characters are presented as tactile indications for a blind or partially sighted person.

13. A method according to claim 12, wherein said indications represent Braille characters.

\* \* \* \* \*